July 9, 1963
C. R. SCHWOB
3,097,254
DETERMINATION OF SHIELDING FACTORS OF COMPLEX STRUCTURES
FOR THE ENERGY RANGE OF 0.1 TO 4.0 MEV.
Filed July 19, 1961
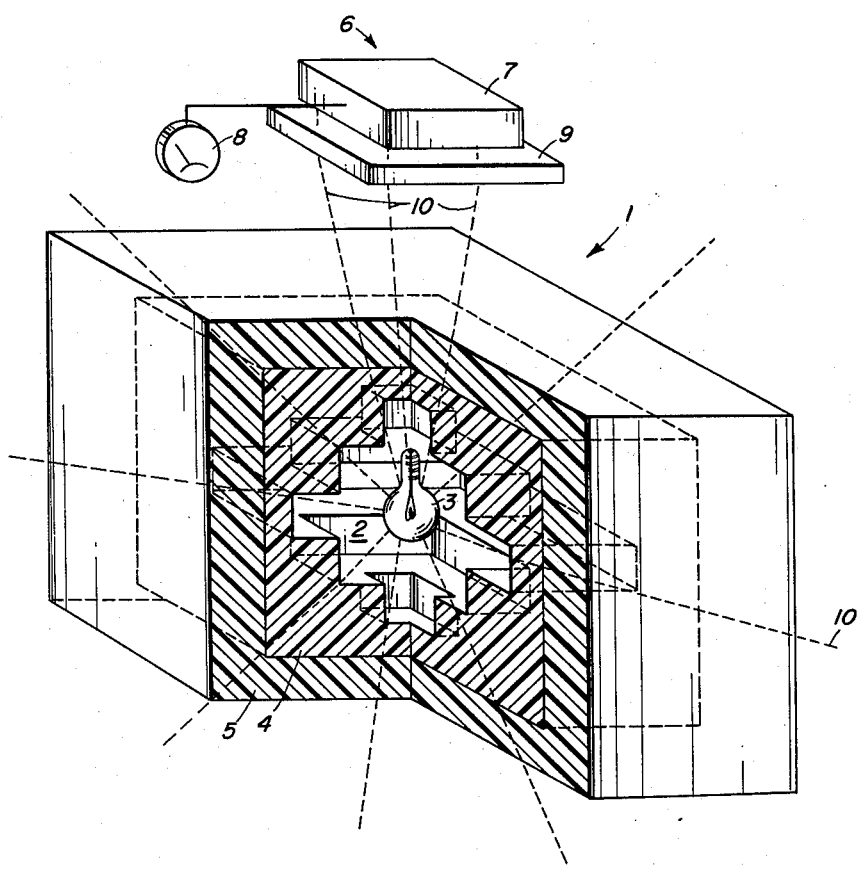
INVENTOR.
CLAUDE R. SCHWOB
BY
*Paul H. Critchlow*
ATTORNEYS United States Patent Office 3,097,254
Patented July 9, 1963

3,097,254
DETERMINATION OF SHIELDING FACTORS OF COMPLEX STRUCTURES FOR THE ENERGY RANGE OF 0.1 TO 4.0 MEV.
Claude R. Schwob, 1156 Kearny St., San Francisco, Calif.
Filed July 19, 1961, Ser. No. 127,087
2 Claims. (Cl. 88—14)
(Granted under Title 35, U.S. Code (1952), sec. 266)

The invention described herein may be manufactured and used by and for the Government of the United States of America for governmental purposes without the payment of any royalties thereon or therefor.

This application is a continuation-in-part of applicant's copending application Serial No. 801,675, filed March 24, 1959, now abandoned, entitled "Determination of Shielding Factors of Complex Structures."

This invention relates to the distribution of radiating energy and particularly to a method for determining the distribution of such energy as it is distributed in accordance with the shielding effects of complex structures.

Previously, the methods employed to determine the distribution of radiating energy within a specific structure involved either actual experiments or calculations. Such experiments were naturally costly, time consuming, and also hazardous, since it was necessary to use hazardous radiation to irradiate the whole structure being considered and to indicate and measure the distribution of energy therein. However, the burdens of such experiments were eased somewhat by simplifying the structure involved, and for example, thick slabs of material were impinged by radiation and engineering measurements taken, but these experiments generally resulted in a sacrifice of accuracy, and their results applied only to simplified structures, not complex realistic ones.

Despite the complicated interaction of radiating energy with matter, the fundamental interactions are well understood and calculations based on the absorption coefficients of materials impinged by particular irradiating energy, such as gamma rays, are in substantial agreement with experimental data for simple geometrical configurations. However, the various radiating energies do have a wide range of attenuations that are dependent on many factors, thereby complicating the calculations. Further, the various attenuations, and therefore to some degree the distribution of energy does change as the incident energy differs. Hence, the particular portion of the energy spectrum of the incident radiation is significant.

With the advent of the atomic age and the hazards thereof, the distribution of energy impinging and penetrating a specified structure became an object of interest. In many instances structures are covered by shielding and the protection afforded thereby is of extensive interest as well as that afforded by the inherent characteristics of the structure itself. Such protection is of special interest in respect to vessels carrying a number of personnel and especially in the energy spectrum wherein damaging radiation may be present. Similarly, reactor shielding is needed for protection of people, and must be of minimum size, weight and cost in many applications.

Therefore, an important object of this invention is to provide a non-hazardous method of indicating the distribution of energy impinging and penetrating a structure whereby extensive calculations and/or actual engineering measurements on full scale structure are not required.

Another object is to provide a method of substantially accurately indicating the distribution of energy impinging and penetrating a structure to thereby narrow the gap between actual engineering measurements and laboratory experiments of simple systems.

Yet another object is to provide a method that is sufficiently flexible to predict the differing attenuations of radiations impinging various structures.

A still further object is to provide a method for determining the distribution of energy whereby the method is uncostly and easily employed.

A more specific object is to provide a method of determining distribution of energy within various structures, no matter what the source of the nuclear radiation, which method covers a relatively wide spectrum of radiating energies, namely 0.1 to 4 mev.

According to the invention a method for indicating and determining the distribution of radiating energy incident upon or originating in a structure has been provided to parallel the engineering measurements and calculations made on full scale structures. More specifically, this is accomplished by using a source of low energy electromagnetic radiation to impinge a model made of an absorbing material having the requisite optical properties in the range of wavelengths of the incident radiation and detecting the radiation, after it is distributed, by a detecting means which is keyed or matched with the incident radiation and absorbing material properties.

Other objects and many of the attendant advantages of this invention will be readily appreciated as the same becomes better understood by reference to the following detailed description when considered in connection with the accompanying drawing.

The drawing shows a perspective view of an illustrative model, namely, a reactor having a portion broken away and suitable apparatus associated therewith for carrying out the steps of the invention.

Reference to the drawing will indicate an illustrative model 1 of a simulated atomic reactor having a cavity 2 which has a suitably powered radiating source 3 positioned and supported therein (by means not shown) to act in lieu of an active portion of a reactor used under actual conditions. Shown surrounding source 3, is a simulated reflector 4 which is made of a material (shown as plastic) and of dimensions in keeping with the principles of this invention, as is simulated shielding 5 (which is also shown as plastic) which surrounds the reflector. Located beyond the simulated reactor 1 and irradiating source 3, is detecting means 6 consisting of detector 7 and indicator 8. Associated with detector 7 is a filter 9 which is used to remove objectionable portions of the radiating energy generally indicated by broken lines 10.

The illustrated reactor is a mere example of the various models that may be used and the various steps of the invention, along with the factors to consider therewith, will become understandable upon consideration of the subsequent discussion.

The essential method steps of this invention involve the provision of a model of the structure being studied, the impingement thereof with a radiating energy, and the indication and measurement of the distribution of the impinging energy. The successful function and the most critical or vital characteristic of this method is its dependence upon the interaction of the various steps and their compatibility with each other. Hence, the choice of material of the model, its shape, design and size, the type of incident radiating energy used, and the detecting means employed, must be matched or keyed in properties one with another to render flexibility and utility in the system to thereby suit the particular conditions being evaluated. This flexibility is significant since the penetrating effects of various radiating forms differ.

Since the most important characteristic of the invention is the provision of a substantially accurate account of actual radiation field effects, it becomes vital to simulate the effects of the structure and shielding being impinged during field conditions. Hence, the various factors or parameters considered under actual field conditions should also be considered in the fabrication of the structure and/or shielding model. Most generally, these involve attenuation, energy decrease of the incident radiation, buildup, and reflection.

As known, attenuation is dependent on various factors, such as the energy of the incident radiation, the density, and atomic number or Z effect. The atomic number and density of the attenuating material determines the photoelectric effect, the pair production effect, and the Compton effect and these are intermingled within the absorbing material at various energies of the impinging radiation. In respect to the energy of the incident radiation, generally the lower the energy the greater its attenuation and this is in keeping with the phenomena of energy decrease to be discussed subsequently. In respect to the density and Z effect, these factors have a large effect on the type of material employed and its size, such as thickness, etc., since the greater the thickness or the density of a material the greater the attenuation. Hence, materials of varying thickness, stock of material, or combination of materials, may be employed to control the extent of attenuation involved.

Energy decrease is effected during the absorption process of the decrease of impinging radiation. Generally, when radiation passes successively through separate but identical walls of material, the attenuation of the radiation which traversed the second wall is greater than that of the first since the emerging energy of the first wall is less than that impinging the wall of the first, and is attenuated a greater extent upon traversing the second wall since its energy is somewhat less.

The buildup factor is due to the "spraying" or "fanning" out of the incident radiation upon emerging from the impinged wall and contributes to all radiation emerging from adjacent areas. When the "spread" or "splash" of each beam of radiation overlaps another the radiation present at any one point is increased and this effect, termed buildup, must be considered. This invention provides for this effect by the translucent character and/or surface roughening of the material or medium used to simulate the shielding or structure being evaluated.

Radiation impinging nearly any form of material (even air in some instances) reflects radiation to some degree. Denser materials, such as solids, accentuate the extent of reflection and hence another phenomenon and its effects must be considered in respect to a choice of material. Further, in enclosed spaces, surfaces, walls, or other sharp density gradients having radiation incident thereon, will reflect such radiation.

Therefore the choice of material is dependent on many factors and its choice will affect the choice of radiation and detecting means as well, but some plastic material is preferably employed since its characteristics are generally well known as well as the fact that it comes in various forms, such as translucent, etc.

In any event the particular type material employed should be one which interacts with the incident radiation in a manner analogous to the interaction of structure and shielding employed under actual field conditions with radiation, such as gamma rays, X-rays, or neutrons that are present under such conditions. Therefore, glass, or oiled or tissue paper may be used as the situation may demand. Special absorption characteristics can be simulated in the material by coloring it, coating with paint or lacquer, for example, and sandwiching colored filters between layers of the material so as not to affect the roughened surface if one is provided. Further, filters may be sandwiched in the walls of the model or they may be tinted to affect the travel of incident light.

The model's scale also depends on the relative response of the material or stock of material the model is fabricated from as it compares to the response of the impinging radiation impinging a structure under field conditions. For example, if energy in the form of long wavelength electromagnetic radiation, namely light, is used to simulate the radiation of the field, and the model is made of plastic, the model's scale will depend upon the relative response of the plastic material to the incident light. Further, it is necessary to construct the model in a manner so the inner partitions, piping, fittings, machinery, etc., will be simulated since they affect the travel and ultimate distribution of radiation under actual conditions. The art of shielding against radiation and the distribution of radiation within a particular structure is replete with information indicating the distribution of energy within a structure and is therefore readily available and hence, the scale of a model can be provided in accordance therewith.

Another important factor to consider is the particular type of radiating energy (such as 3 of the drawing) to employ to simulate the radiating energy which impinges the structure or shielding during actual field conditions. Here again, its interaction with the material of the model and the detecting means must be considered. However, assuming plastic, glass, or the like is being utilized, some suitable radiating energy such as a source of low energy electromagnetic radiation of ultra-violet, visible, or infrared frequencies may be employed. In such a situation the reflection, refraction, and absorbence of light by the plastic stock will largely control the distribution of the incident radiation.

Yet another important feature of the invention is that the distribution of the radiating energy must be indicated by some means (such as 6 of the drawing) compatible with light radiation and a suitable indicating means or detector, such as small photocells, phototubes, or the like, may be distributed throughout the model for indicating the amount of radiation reaching a specific point. The detector indicates the distribution of the incident radiation after it has been attenuated, etc., so as to indicate the absorption, reflection, or scattering of the impinging light throughout the model. As an example of the particular type of photocell that may be utilized, a PbS cell, or the like may be used and a number of them are positioned within the model in suitable locations to indicate the distribution. In addition, a detector may be employed having a spectral response that corresponds with the sensitivity of the human body, thereby giving a more direct indication of the damage to humans.

As indicated, the characteristics of the receiver or detector are also a factor in the choice of the material and the incident radiating source. Hence, the detector must be compatible with the light source in the sense that it must be capable of detecting and measuring the incident radiation after it emerges, and it is thereby modified, by its passage through the absorbing medium. In addition, it is advisable in many instances to vary the spectral sensitivity of the receiver or detector by using optical filters (such as 9 of the drawing) to accentuate response in a particular region of the spectrum and/or to attenuate it in others. For instance, a light source may be acceptable in substantially any sense but still emit a band of wavelengths which may interfere with measurements at other wavelengths. To avoid providing another light source, filters may be utilized to remove the objectionable wavelengths of the spectrum. Generally, the use of a filter near the detector is more practical than when used with the source since the sources are generally bulky and a large filter would have to be used therewith, and also since the source generally produces heat which affects the filter. Hence, a smaller filter may be used which is less expensive and generally more uniform in its optical properties.

In practice, a method for indicating and determining the distribution of radiating energy after impinging a structure encased in a shielding or a structure and/or shielding, has been provided. For instance this method may be used to determine whether a certain location within a ship is safe after radiation is incident on the ship. Hence, a model of the ship (or an encased reactor as illustrated by the drawing) is built and this method is utilized to obtain the desired information. The vital characteristic of the invention resides in the matching, integrating, or keying of the various steps to bring about an interrelation of action which provides a simplified, uncostly, easily used method, for evaluating and determining the distribution of radiating energy within a structure that is incident thereon. The various steps involve the use of energy and physical structure that are predetermined according to their interaction one with the other and the accuracy, efficiency and flexibility that may be afforded thereby. This interaction, or interactions, is dependent upon a multiple of factors whose nature and value comes from readily available literature.

The light source can be specifically adjusted in size, intensity, shape and geometrical (special) relations to the model, to simulate and otherwise reproduce the source(s) of radiation for which the measurements are desired. A source of small extent (so-called "point source") can be provided for the simulation of non-distributed radiation sources as, for example, the explosion of a nuclear weapon. A larger source of suitable shape (provided by a housing or shade) can represent the core of a nuclear reactor, or a specific item giving off nuclear radiation. An extended radiation field source such as produced by the fallout from nuclear weapons or by spills and accidents can likewise be simulated by using corresponding sealed extended light sources. In the latter case, terrain irregularities and geographical features can be incorporated as part of the model as is desirable or necessary.

More specifically, the method involves the basic steps of fabricating a model (such as 1 of the drawing) from a stock or stocks (4 and 5 of the drawing), of material, and to a scale and design, to simulate a structure used in the field; impinging the model with a radiating energy (3) simulating hazardous radiation; and measuring or indicating the distribution of such radiating energy by suitable means (6). To possess the flexibility desired of such a method so a wide range of field conditions may be simulated, it becomes mandatory to choose a radiating energy, a stock of material, and indicating means, that are all keyed or matched in properties, one to the other, to effect an accurate reaction. Very broadly, this may involve a source of low energy electromagnetic radiation, a plastic, glass, or oiled paper stock of material having the requisite optical properties in the range of the wavelengths of the incident radiation; and a detecting device having properties for detecting properties in accordance therewith.

For example, model 1 shown in the drawing which simulates a reactor, may be made of plastic material to simulate the behavior of materials commonly used in the construction and shielding of nuclear reactors. The radiations from the reactor core are represented by the light source 3, which is an incandescent bulb supplied with operator-variable, stable voltage electricity which is adjusted in this case to give a Kelvin temperature of about 34000 or which is surrounded with a light blue filter (in the manner of blue photographic bulbs) to give the same effect. The moderate preponderance of blue is necessary to simulate the rather high-average energy of the electromagnetic radiation produced by the usual design of nuclear reactors. Narrow-band or monochromatic blue is not used because lower-energy nuclear radiation is also present and must be included to make conclusions from the use of the model valid. Surrounding the reactor core, sometimes in contact with it, or with a space 2 for coolant gas or other purpose, is a reflector 4 which may be made of polished plastic which would usually be transparent because little attenuation normally takes place in the reflector. The shield itself is represented by a layer of plastic 5 which attenuates and degrades the light to an extent designed to be similar to the shielding requirements in the case at hand (depending on power of reactor, and radiation dose permitted for personnel). This is achieved by using yellow-tinted plastic (to produce "degradation") and a neutral-density filter either on the outside surface or at the junction of reflector 4 and shield 5. Alternately, the neutral-density filter effect (to produce attenuation) may be obtained by incorporating a grey pigment to the plastic, or any combination of filters and clear plastic and colored or grey plastics with no filters may be used. In actual practice, the greatest flexibility is obtained when clear or near-clear plastics are used, and attenuation and degradation produced by sheet filters which are easily replaced. Either the interior or exterior surface of shield 5 may be roughened to produce scattering effects. The detector 6 may be a photocell 7 and a meter 8 which quantitates the quantity of light falling on the cell 7. A filter 9 in front of the photocell may or may not be used to match the characteristics of the cell to the characteristics of the remainder of the system. If the response characteristics of the photocell 7 are uniform, that is, if it is equally sensitive to all wavelengths of the light rays 10 impinging upon it, then a reading without filter gives the sum total of the rays or radiation escaping through the shield in the solid angle intercepted by the cell. This sum is related directly to the transmission of the simulated high-energy radiation in the actual case, and the ratio of this sum value to the photocell reading with all components in place except the shield 5 and its associated filters, if any, is the "shielding coefficient" that is the measure of effectiveness of the shield for the purpose designed. On the other hand, if the effects on the human body are important, then a filter 9 can be placed over the photocell, so that now the photocell responds less to the yellow or red components of the transmitted light (corresponding to the lower-energy portion of the high-energy electromagnetic spectrum which is known to be less efficient in producing biological damage in human beings than the higher-energy portion) while its response to higher-energy (blueish) components is unchanged. Since very few photocells exhibit a uniform response to the whole spectrum of visible radiation (not to speak of infrared and ultraviolet too), the filter 9 is most often used to adjust the response of photocell 7 to uniformity, or to match the biological damage curve as it is known. For special work, a photocell or combination of photocell and filter having even higher specificity may be employed, or the transmitted light passed through a prism or grating for complete analysis.

The proper choice of radiating energy, stock of material, design of the model, and the indicating means, does effect a simulated field condition so a substantially accurate account may be taken. Hence, the need for extensive calculation and/or actual engineering measurements on full scale structure is no longer required and the gap between actual engineering measurements and laboratory experiments on simple systems is narrowed, if not done away with, since a more adequate method is available. Such a method that interrelates the various steps is sufficiently flexible to predict the differing attenuations of structures. This is further pointed up by the fact that the model may be constructed in portions or sections for ready interchangeability, or covered by varying the layers of material (by thickness changes and/or type and number of layers of materials) to change results. Further, a wide energy spectrum may be covered since the various steps are within the same range and since a good detecting system may be employed. This permits detection over a substantial range of energy such as 0.1 to 4 mev. thereby permitting a coverage over the major portion of hazardous radiations.

This method, in particular, substitutes visible or near-visible (ultra-violet, infra-red) light for the more energetic nuclear or radioactivity radiation; substitutes translucent and/or colored material for the ordinary construction materials used in the actual structure being studied and in smaller scaled proportions; and substitutes suitable detectors and indicators of visible or near-visible light for the radiation-detection instruments normally used in radiation and shielding studies. Alternately, the detectors used may be considered to substitute for human bodies and other sensitive objects. By these substitutions the determination of the shielding and protective characteristics of existing structures, or the progressive design and testing of contemplated structures, is facilitated by being made more rapid, less expensive and safer than would otherwise be the case where full-scale tests of actual structures are undertaken using intense sources of radioactivity or nuclear radiation.

An operational analysis of the present invention may well be made in terms of the individual phenomena which result when high-energy radiation interacts with matter:

(1) When high-energy radiation passes through matter it is attenuated, that is, its intensity is decreased. This decrease depends upon two factors: (a) the nature of the material: denser materials cause greater attenuation than less dense ones; and (b) the thickness of the material: the thicker it is, the greater the attenuation. Similarly, in this invention the intensity of the light (or low-energy electromagnetic radiation) is decreased by passing through the plastic (or other transparent or translucent material). The extent of this decrease is controlled by the thickness of the material, as in the "real" case, and by the color of the material or filters used in conjunction with the material, this color corresponding roughly with the density of the material. If the color is dark grey (neutral density filter of optics) the effect is greatest corresponding to very high-density materials. If the color is a lighter grey, close to transparent, then the effect is less, thereby simulating less dense materials.

(2) When high-energy radiation passes through matter it is scattered or diffused or refracted in a non-regular manner. This is very similar to the diffusion of light passing through a translucent medium. This effect is simulated, in this invention, by means which normally cause diffusion of light: roughening the surface of the medium, using translucent rather than transparent materials, or by the inclusion of a translucent or diffusing filter or screen in the path of the light. This diffusion effect is important under several circumstances. When the source of radiation is in the form of a beam, the use of a shield may cause it to diffuse or fan out, so that areas to the side of the beam can become more dangerous when a shield is used than they were before the shield was used. Again, when extended sources (that is, sources which are physically large in size, such as the core of a nuclear reactor) are involved, the radiation transmitted through the shield at any one point in space beyond the shield is that coming through the shield immediately adjacent to it and that diffused from surrounding areas of the shield. The total effect is a virtual reinforcement of the radiation at singular points.

(3) When high-energy radiation passes through matter it is degraded, that is, it suffers a loss in energy. In this invention this phenomenon is simulated by purely optical means. In passing through the simulated shield (plastic or other transparent or translucent material) the light is changed in color, generally given a more reddish tinge.

This is achieved by using a fairly broad-band source of light, not monochromatic in the strict sense, although it may contain a preponderance of blue or voilet (to simulate high-energy electromagnetic radiation) or conversely, a preponderance of yellow or red (to simulate the lower ranges of the high-energy electromagnetic radiation). Color filters, or the actual color of the simulated shield are chosen to filter out the blue or violet components to the extent desired, so that the issuing or emergent radiation is now more yellow or red, and is thus "degraded" in energy. This is easily achieved by using yellow or orange or red colors in the shield. This effect is completely distinct from that described in the second paragraph above labeled (1), in which the purpose was to attenuate all colors nearly equally. Filters or materials for each effect are simultaneously incorporated in the simulated shield or added to it, and each acts independently, and contributes to the over-all effect.

(4) A fourth phenomenon concerning the interaction of high-energy radiation with matter is of importance when the shield is in an area surrounded by walls or surfaces, such as a reactor inside a building, or when the person or object to be protectde is inside an area surrounded by matter, such as an astronaut in a cabin exposed to Van Allen and cosmic radiation, or personnel in the rooms of a building exposed to nuclear or fallout radiation. This phenomenon is reflection. High-energy electromagnetic radiation is reflected from surfaces somewhat in the same manner as light from a mirror, but to a much lesser extent. A plastic surface does reflect some light and this effect is used to simulate, in this invention, the reflection that would take place in the real case with high-energy electromagnetic radiation being partly reflected by a wall or structure.

Obviously many modifications and variations of the present invention are possible in light of the above teachings. It is therefore to be understood that within the scope of the subject matter being claimed that the invention may be practiced otherwise than as specifically described.

What is claimed is:

1. An apparatus for determining the shielding responses of complex structures to high-energy-level electromagnetic radiation falling within the range of from about 0.1 mev. to about 4 mev. which comprises:

(a) a translucent model of the complex structure under investigation, said translucent model having light attenuation, scattering, degradation and reflection characteristics which correspond respectively to the attenuation, scattering, degradation and reflection characteristics of the complex structure in response to high-energy-level electromagnetic radiation in the range of from about 0.1 mev. to about 4 mev.;

(b) said translucent model being selectively tinted with grey color for attainment of a preselected light attenuation characteristic, having a selectively roughened surface for attainment of a preselected light scattering characteristic, being selectively colored in the range of yellow to red for attainment of a preselected light degradation characteristic and having a selectively polished surface for attainment of a preselected light reflection characteristic;

(c) a light source fixedly positioned with respect to said model and located on that side of said model corresponding to the side of the complex structure which would be exposed to the 0.1 to 4 mev. electromagnetic radiation, the source geometry of said light source being a facsimile of the source geometry of the high-energy-level electromagnetic radiation against which the complex structure is to serve as a shield and said light source upper spectral level occupying the same relative position in the light spectrum as is held by the highest radiation to be encountered within the 0.1 to 4 mev. range; and (d) a light-sensitive detector which measures for a given area the total of light rays escaping through said translucent model and which is responsive to a preselected light spectrum range which is comparative to the energy level range of the high-energy-level 0.1 to 4 mev. electromagnetic radiation against which the complex structure is to serve as a shield, the response of said detector serving to indicate the measure of effectiveness of the shielding effect provided by the complex structure, said light-sensitive detector being selectively positionable at any area-to-be-tested on the light-shielded side of said model.

2. The apparatus of claim 1 wherein said light source is actuated by an operator-selectable, constant-value electrical voltage, emits a broad band of light and has a preponderance of emission in the blue to violet spectral range.

References Cited in the file of this patent

UNITED STATES PATENTS

| | | |
|---|---|---|
| 1,726,501 | Norris | Aug. 27, 1929 |
| 1,754,332 | Norris | Apr. 15, 1930 |
| 2,296,815 | Evans | Sept. 22, 1942 |
| 2,326,194 | Barton | Aug. 10, 1943 |
| 2,328,456 | Humphreys | Aug. 31, 1943 |
| 2,893,138 | Golie | July 7, 1959 |
| 3,035,771 | Gerrard et al. | May 22, 1962 |